United States Patent
Vasija et al.

(10) Patent No.: US 6,236,118 B1
(45) Date of Patent: May 22, 2001

(54) METHOD OF GENERATING ELECTRICITY

(76) Inventors: Luciano Vasija, 280 1570 Adelaide Street North, London, Ontario (CA), N5X 2L7; Joseph L Perdomo, 37 Clemens Street, London, Ontario (CA), N5Y 1H7

(\*) Notice: Subject to any disclaimer, the term of this patent is extended or adjusted under 35 U.S.C. 154(b) by 0 days.

(21) Appl. No.: 09/448,473

(22) Filed: Nov. 24, 1999

(51) Int. Cl.[7] ................. H02P 9/00; F03G 7/00
(52) U.S. Cl. ................................. 290/1 E; 290/1 R
(58) Field of Search .................. 290/1 R, 1 E, 290/1 C; 322/1

(56) References Cited

U.S. PATENT DOCUMENTS

| | | | |
|---|---|---|---|
| Re. 36,428 | \* 12/1999 | Moore et al. | 296/155 |
| 1,624,656 | 4/1927 | Bryan, Jr. | |
| 3,800,212 | \* 3/1974 | Branco et al. | 322/28 |
| 3,970,939 | \* 7/1976 | Willis | 325/185 |
| 4,433,355 | \* 2/1984 | Chew et al. | 361/172 |
| 4,524,283 | 6/1985 | Latvus | 290/1 E |
| 4,698,967 | \* 10/1987 | Longora | 60/325 |
| 5,203,110 | \* 4/1993 | Hormann | 49/28 |
| 5,831,417 | \* 11/1998 | Chu | 322/1 |

\* cited by examiner

*Primary Examiner*—Nicholas Ponomarenko
(74) *Attorney, Agent, or Firm*—Richard C. Litman

(57) ABSTRACT

A method and an apparatus for generating electricity from the ordinarily wasted mechanical energy expended when opening a door. The apparatus includes a ratchet attached to a door which rotates a connecting shaft when the door is opened. The connecting shaft is connected by a gear train to a spring housing in which a spiral shaped spring is fitted and connected to a spring shaft. The spring shaft is coupled by a second gear train to the driveshaft of a generator. Opening the door causes compression of the spiral plate spring, which causes rotation of the driveshaft of the generator in order to generate electricity when the spring is uncoiled. A stopper engages teeth on the bottom plate of the spring housing to prevent reverse rotation of the spring shaft when the door is closed.

8 Claims, 9 Drawing Sheets

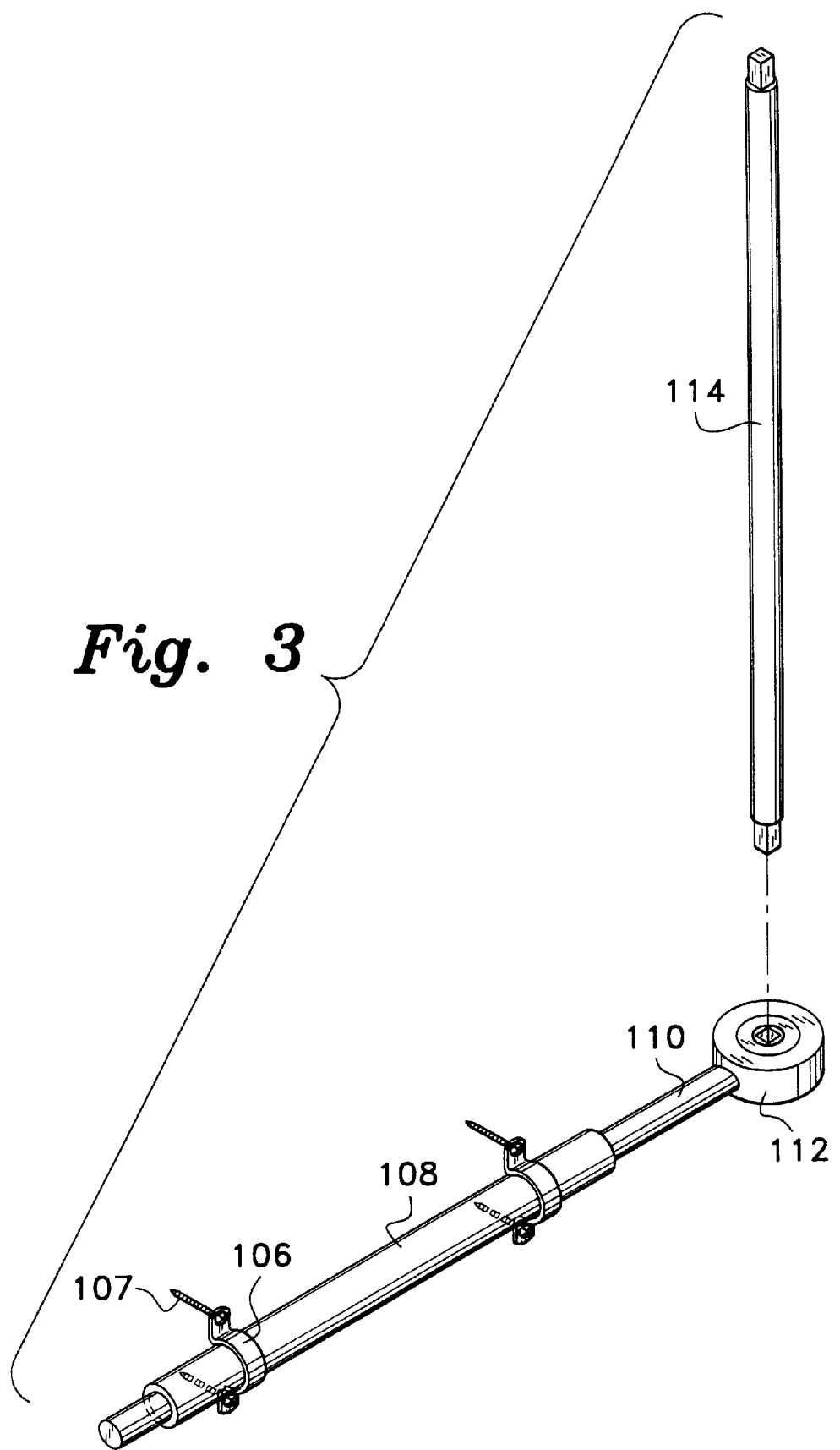

METHOD OF GENERATING ELECTRICITY

BACKGROUND OF THE INVENTION

1. Field of the Invention

The present invention relates generally to a method and apparatus for generating electricity and more particularly, to a method and apparatus for utilizing the kinetic energy expended when manually opening a door.

2. Description of the Related Art

Doors are repeatedly opened and closed a countless number of times each day, for example, at busy shopping malls, at mass transportation stations such as subway stations and train stations, and in office buildings. Harnessing all that mechanical energy would be highly advantageous. Converting all that kinetic energy to electrical energy would be an extremely efficient and cost effective way of generating electricity.

The prior art describes a number of apparatuses used to convert mechanical energy to electrical energy, for example, a means for utilizing the surplus energy exerted in operating revolving doors is described in U.S. Pat. No. 1,624,656 issued on Apr. 12, 1927 to B. B. Bryan, Jr. The apparatus involves the installation of a power wheel co-axially on a revolving door.

U.S. Pat. No. 4,524,283 issued on Jun. 18, 1985 to V. P. Latvus describes an energy converter. The device converts the mechanical energy of slow and random movements to a more useful form of high-speed rotation.

None of the above inventions and patents, taken either singularly or in combination, is seen to describe the instant invention as claimed. Thus a method of generating electricity solving the aforementioned problems is desired.

SUMMARY OF THE INVENTION

Accordingly, it is a principal object of the invention to provide a method and an apparatus for converting the kinetic energy of an opening door to electrical energy.

It is another object of the invention to provide a method and an apparatus that conveniently and efficiently stores mechanical energy.

It is a further object of the invention to provide an apparatus with one way rotational coupling.

It is an object of the invention to provide improved elements and arrangements thereof for the purposes described which is inexpensive, dependable and fully effective in accomplishing its intended purposes.

To meet the above objectives, the present invention provides a method and an apparatus for conveniently and efficiently converting the kinetic energy expended when a door is opened to electrical energy that be used in a variety of applications, for example, lighting a room or building. The apparatus of the present invention comprises an electrical generator, an oil filled gear box, a spring containing spring mechanism, and one way rotation coupling via a connecting rod and ratchet assembly. The connecting rod-ratchet assembly functions as a lever converting the ordinarily wasted mechanical energy from door opening to useful electricity.

These and other objects of the present invention will become readily apparent upon further review of the following specification and drawings.

BRIEF DESCRIPTION OF THE DRAWINGS

FIG. 3 is a perspective view of the ratchet-shaft assembly shown in FIG. 1.

Similar reference characters denote corresponding features consistently throughout the attached drawings.

DETAILED DESCRIPTION OF THE PREFERRED EMBODIMENTS

Figure 1:
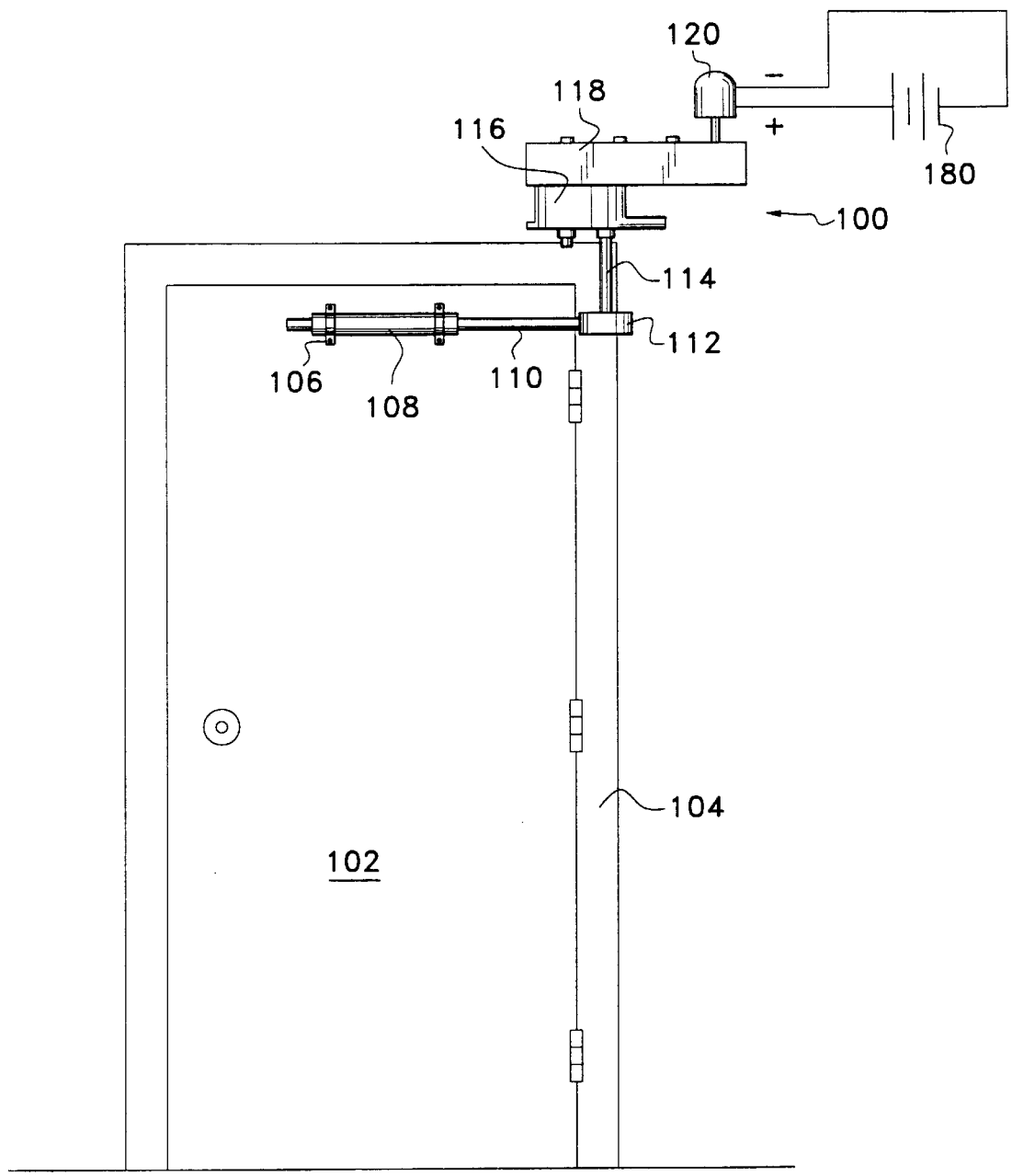
FIG. 1 is an environmental, front view of a kinetic energy powered electrical generator mounted over a door and door frame according to the present invention.

The present invention relates to an apparatus and method by which the energy expended during the simple act of opening a conventional door 102 is collected and converted to electrical energy. The kinetic energy imparted to a door 102 by a person opening the door 102 is stored in a conventional plate spring 137 and transferred to the primary gear 154 of a gear box 118 which rotates the drive shaft 168 of an electrical generator 120.

FIG. 1 shows an environmental, front view of a kinetic energy powered electrical generator 120 mounted over a door 102 and door frame 104 according to the present invention. As a door 102 is opened, its kinetic energy of motion is transferred to and stored in a plate spring 137 by the compression of the spring 137. The door's kinetic energy is transferred to the spring 137 by means of a ratchet-shaft assembly (108, 110, 112) that is mounted on the door 102 and the door frame 104. The opening of the door 102 causes the unidirectional rotation of a connecting shaft 114 that is mechanically coupled to the spring housing 136 and the spring housing 136 is connected to one end of the spring 137. The other end of the spring 137 is connected to the spring shaft 160 of the spring mechanism and turns the primary gear 154 of a gear box 118. The spring mechanism comprises the spring 137, the spring shaft 160, a gear train including the spring primary winding gear 134 and the spring secondary winding gear 148, the spring housing 136, and the spring mechanism casing 116.

As the connecting shaft 114 rotates in response to the opening motion of the door 102, it rotates the spring housing 136 which, in turn, winds the spiral shaped plate spring 137. The plate spring 137 is compressed by the rotation of the connecting shaft 114 and the kinetic energy of the door's opening motion or movement is transferred to and stored in the compressed spring 137. The spring housing bottom plate 138 has teeth disposed around its periphery which engage a gear stopper 144 to prevent the spring 137 from turning back the spring winding secondary gear 148, the spring housing bottom plate 138, and the spring housing 136 as the door 102 returns to a closed position, after the fashion of a pawl. The action of the gear stopper 144 also keeps the spring winding secondary gear 148, the spring housing bottom plate 138, and the spring housing 136 stationary when the winding action of the spring by the connecting shaft 114 stops, which forces the compression tension in the spring 137 to be released in one direction only and that is through the spring shaft 160. Furthermore, because the rotational direction of the spring shaft 160 is the same as the winding direction of the spring 137 and spring housing 136, when the spring 137 is wound there is an extra push to the spring shaft 160 in the same direction as the spring 137 is rotating the spring shaft 160. Parts are arranged and configured so as to prevent the spring shaft 160 from rotating with the housing 136 so that the spring 137 may become wound.

Figure 2A:
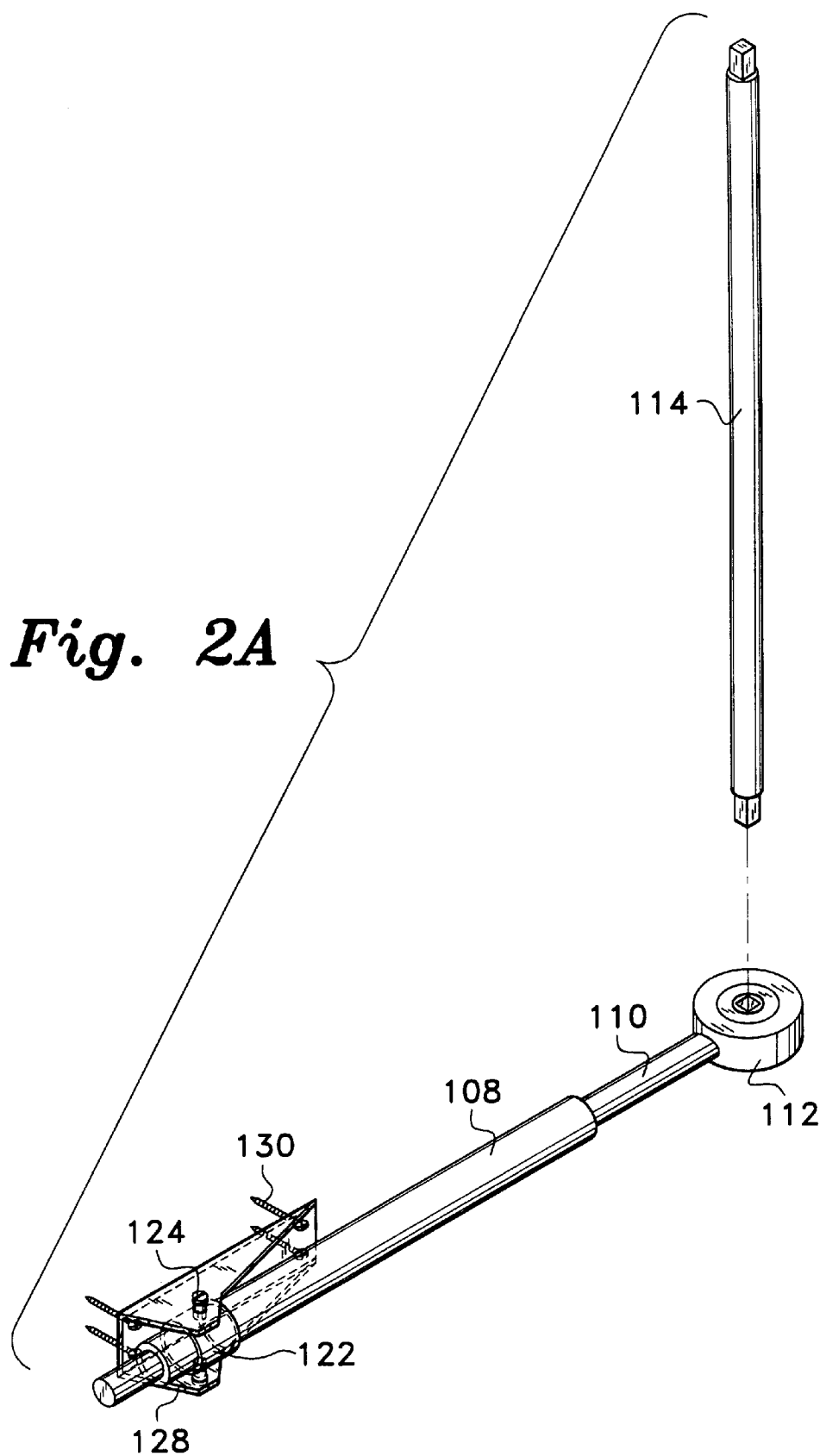
FIG. 2A is a perspective view of a preferred embodiment of the ratchet-shaft assembly.

FIG. 2A is a perspective view of a preferred embodiment of the ratchet-shaft assembly (108, 110, 112) of the present invention. In the preferred embodiment, the ratchet sleeve 108 is secured to the door 102 by means of a holding ring 122 pivotally attached to a base plate 128.

Figure 2B:
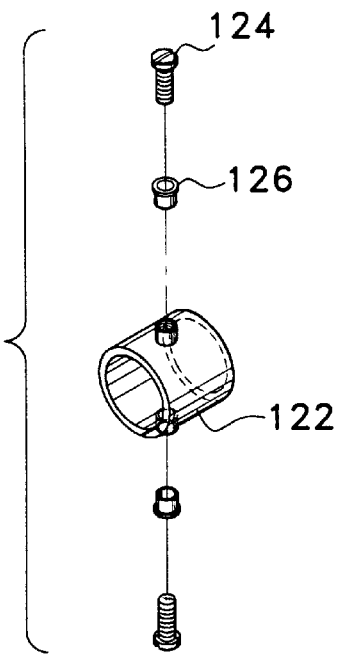
FIG. 2B is an exploded, perspective view of a sleeve holding ring.
Figure 2C:
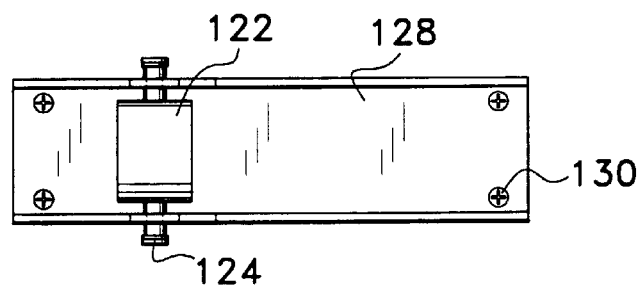
FIG. 2C is a top view of the holding ring mounted on the base plate.
Figure 2D:
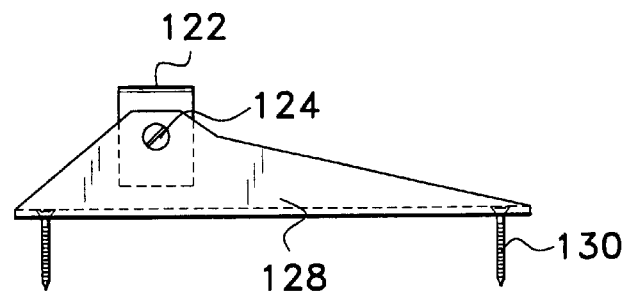
FIG. 2D is a side view of the holding ring mounted on the base plate.

FIG. 2B is an exploded, perspective view of a sleeve holding ring 122 and base plate 128. The holding ring 122 is secured to the base plate 128 by means of a pair of screws 124. A screw cover 126 minimizes pivotal friction. FIG. 2C is a top view of the holding ring 122 mounted on the base plate 128. FIG. 2D is a side view of the holding ring 122 mounted on the base plate 128. The base plate 128 is secured to a door 102 by means of four screws 130. The ratchet sleeve 108 is a tubular length of material that allows minimal friction which provides a solid, secured riding guide for the ratchet-end shaft 110 that runs horizontally across the door 102. The ratchet-end shaft 110 connects to a vertically disposed connecting shaft 114 by means of a ratchet 112 which permits the connecting shaft 114 to rotate only when the door 102 is opened. The connecting shaft 114 does not rotate when the door 102 is closed. The ratchet-end shaft 110, the ratchet 112, and the connecting shaft 114 create a lever which transfers the kinetic energy of the motion of the opening door through the connecting shaft 114 directly to the shaft 135 of the spring winding primary gear 134.

FIG. 3 is a perspective view of the ratchet-shaft assembly (108, 110, 112) shown in FIG. 1. In this alternate embodiment of the ratchet-shaft assembly (108, 110, 112), the ratchet sleeve 108 is attached directly to a door 102 by a pair of sleeve fasteners 106. The sleeve fasteners 106 are secured to the door 102 by a pair of screws 107.

Figure 4:
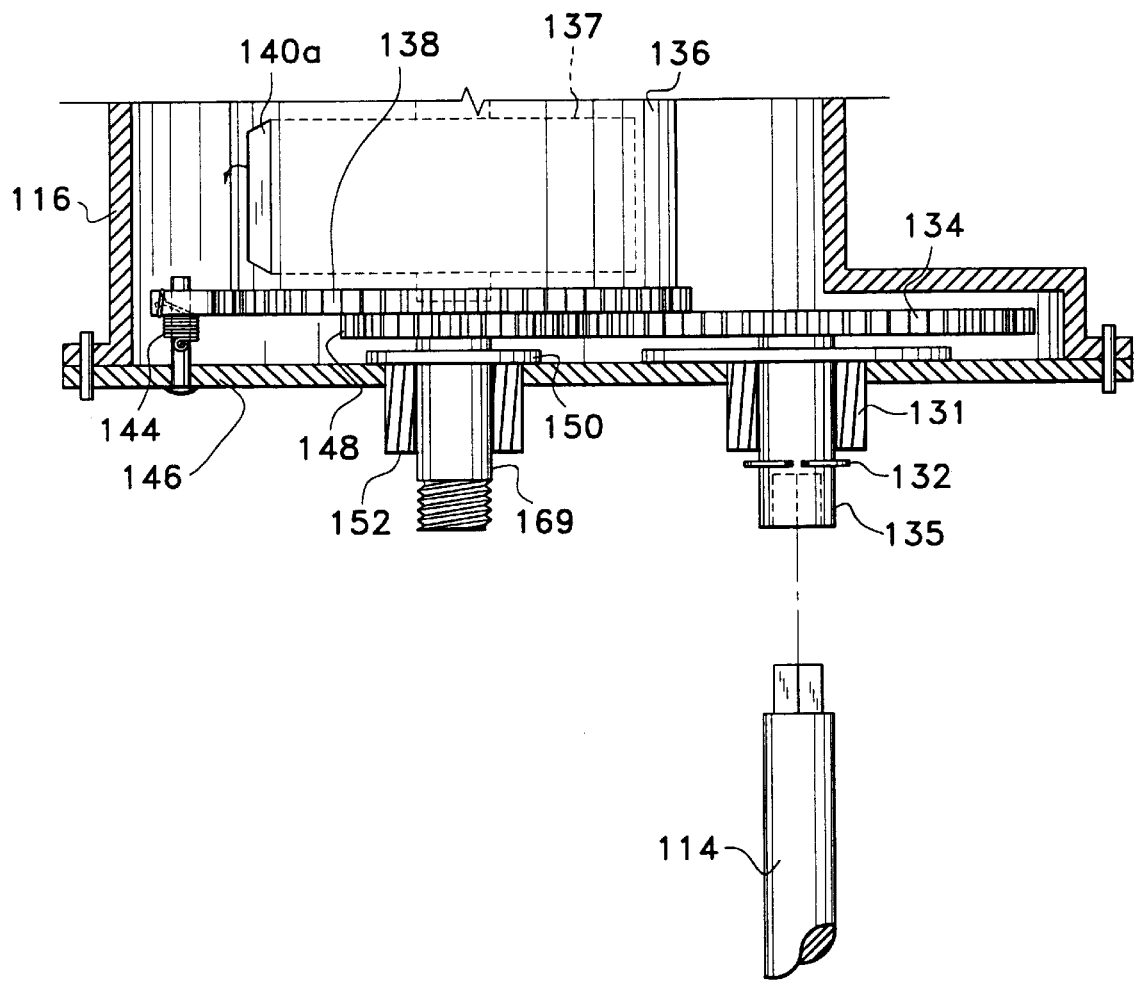
FIG. 4 is a longitudinal section view of the spring mechanism within its casing.

FIG. 4 is a longitudinal section through the spring mechanism casing 116 showing the internal structure and workings of the spring mechanism. The orientation of a spring-end tab 140*a* that extends through the spring housing 136 indicates the direction of rotation required to wind the spring 137. For example, the springend tab 140*a* in FIG. 4 points to the left which means the connecting shaft 114 must have a counterclockwise rotation to wind the spring 137 which rotates in a clockwise direction. The spring 137 unwinds in a clockwise direction which causes the clockwise rotation of the spring shaft 160. The spring winding primary gear 134 acts upon the spring winding secondary gear 148 at a preferable ratio of 1:5 or better. The spring winding secondary gear 148 is directly attached to the spring housing bottom plate 138 which is fitted with teeth on its outer edge.

The strength and torque produced by the spring 137 when fully wound is determined by the size of the spring 137. The size of the spring 137 is determined by the size of the door 102 and the amount of space available for the installation of the electricity generating assembly 100. The electricity generating assembly 100 can be installed above, below, or beside a door 102. FIG. 4 also shows the location of bushings 150 and bushing housings (131, 152) and the location of a locking spring 132 primary gear shaft 135 connection. The spring winding secondary gear shaft 169 is secured to the base plate 146 of the spring mechanism casing 116 by means of a washer 166 and locking nut 162.

Figure 5:
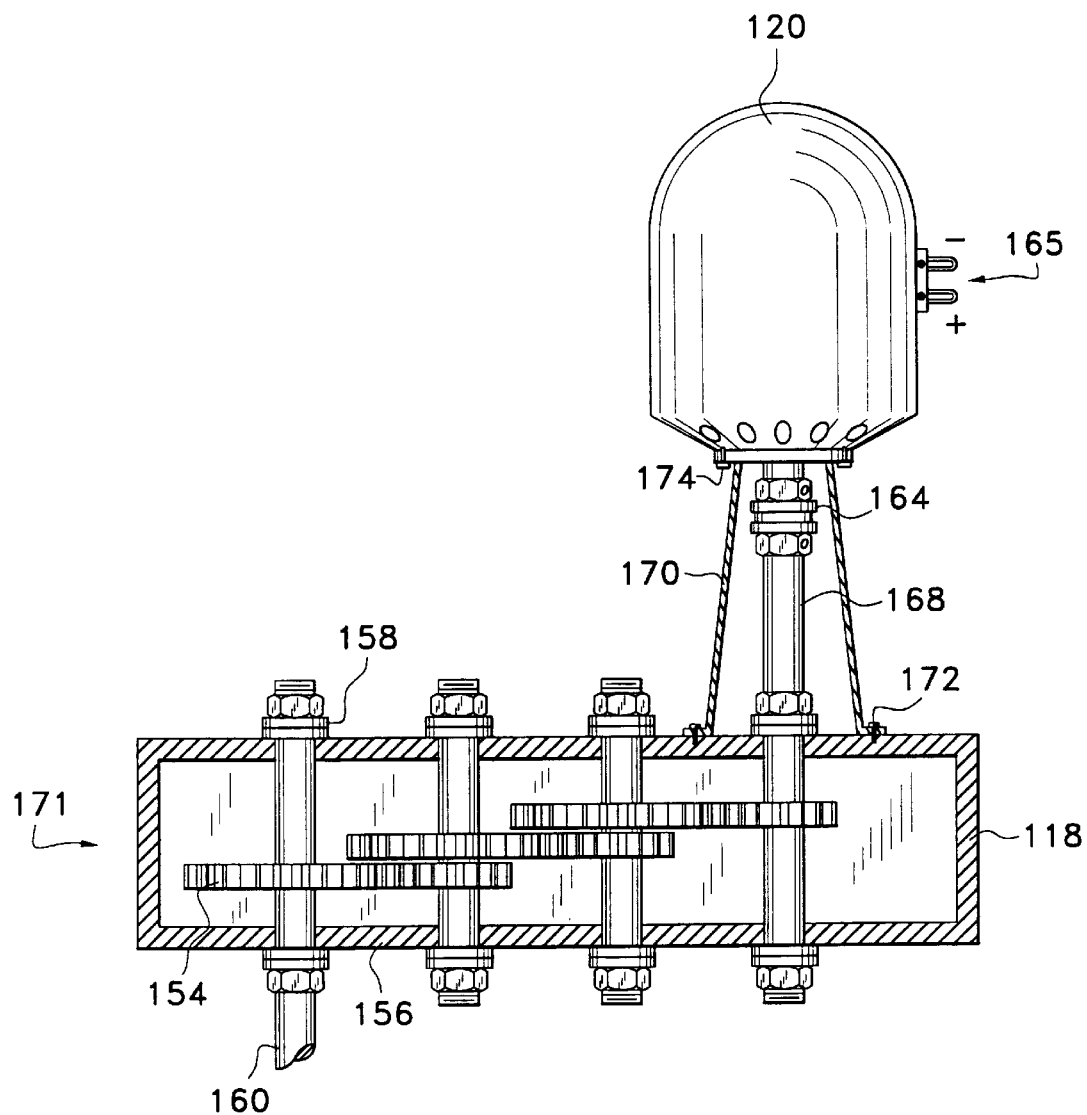
FIG. 5 is a longitudinal section view of the gear box.

FIG. 5 is a longitudinal section view of the gear box 118 showing the internal structure of the gear box 118. The gear box 118 rotates the drive shaft 168 of the electrical generator 120 with the generated voltage appearing across the output terminals 165 of the electrical generator 120. The output terminals are electrically connected to a device for storing electrical energy, such as a storage battery 180, a capacitor or the like. The gear box 118 and generator 120 are connected via connective coupling 164. The generator base 170 is bolted to the generator 120 and the gear box 171 using bolts 172,174. FIG. 5 also shows the location of the bearings 158 and the point of entry of the spring shaft 160 through the bottom plate 156 of the gear box casing 118. In a preferred embodiment, the gear box 118 is oil filled.

Figure 6:
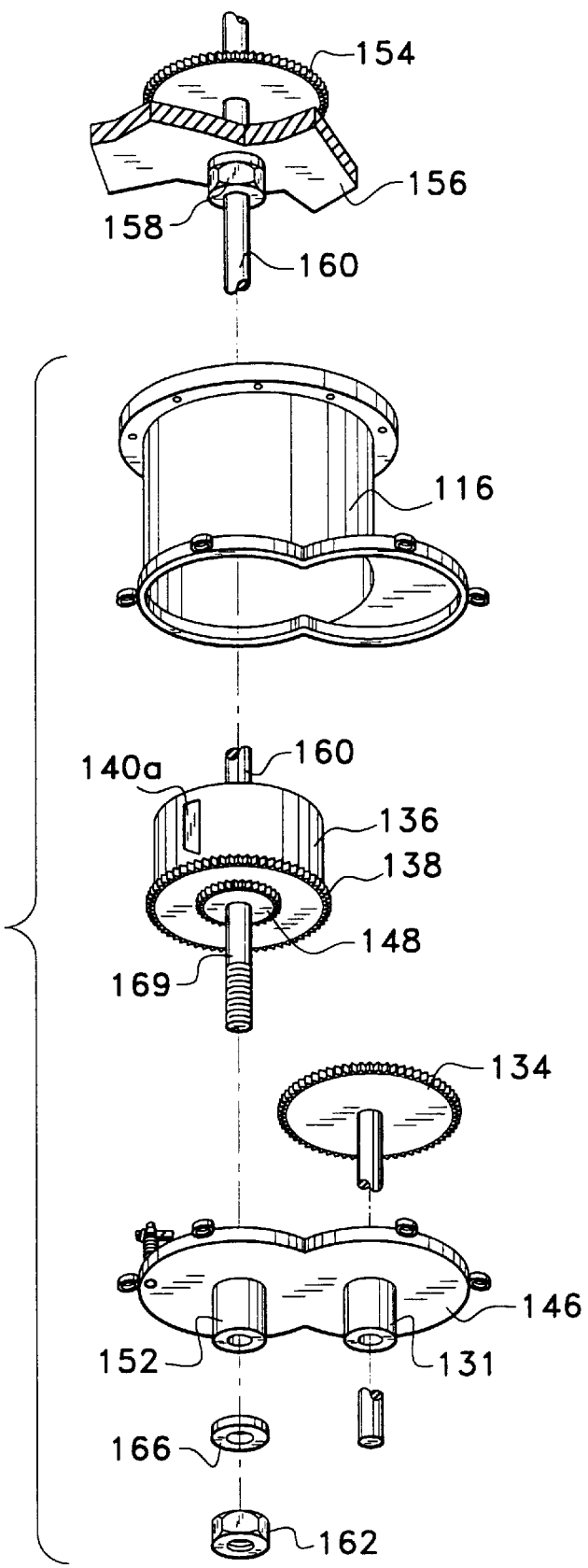
FIG. 6 is an exploded, perspective view of the spring mechanism.
Figure 7A:
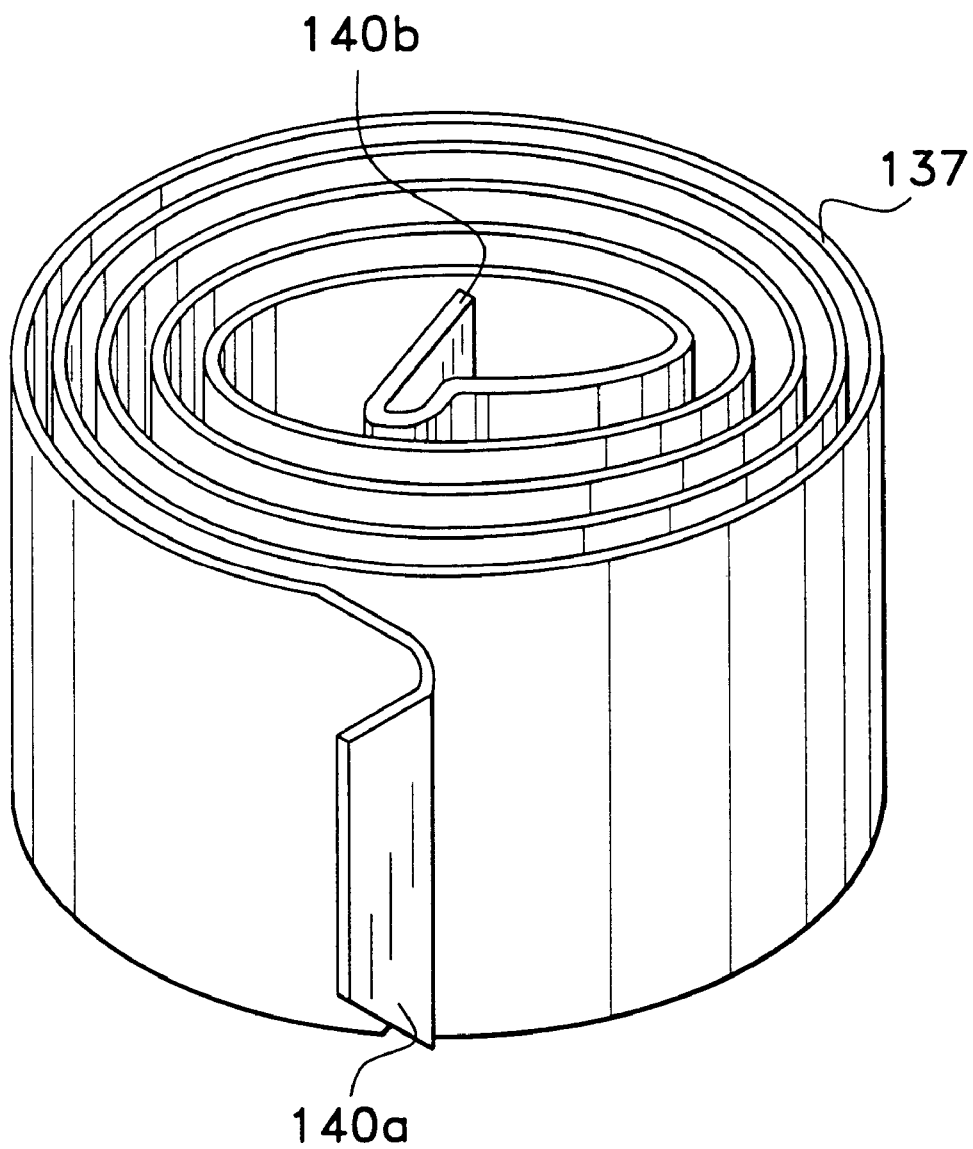
FIG. 7a is a perspective view of a spiral shaped plate spring.
Figure 7B:
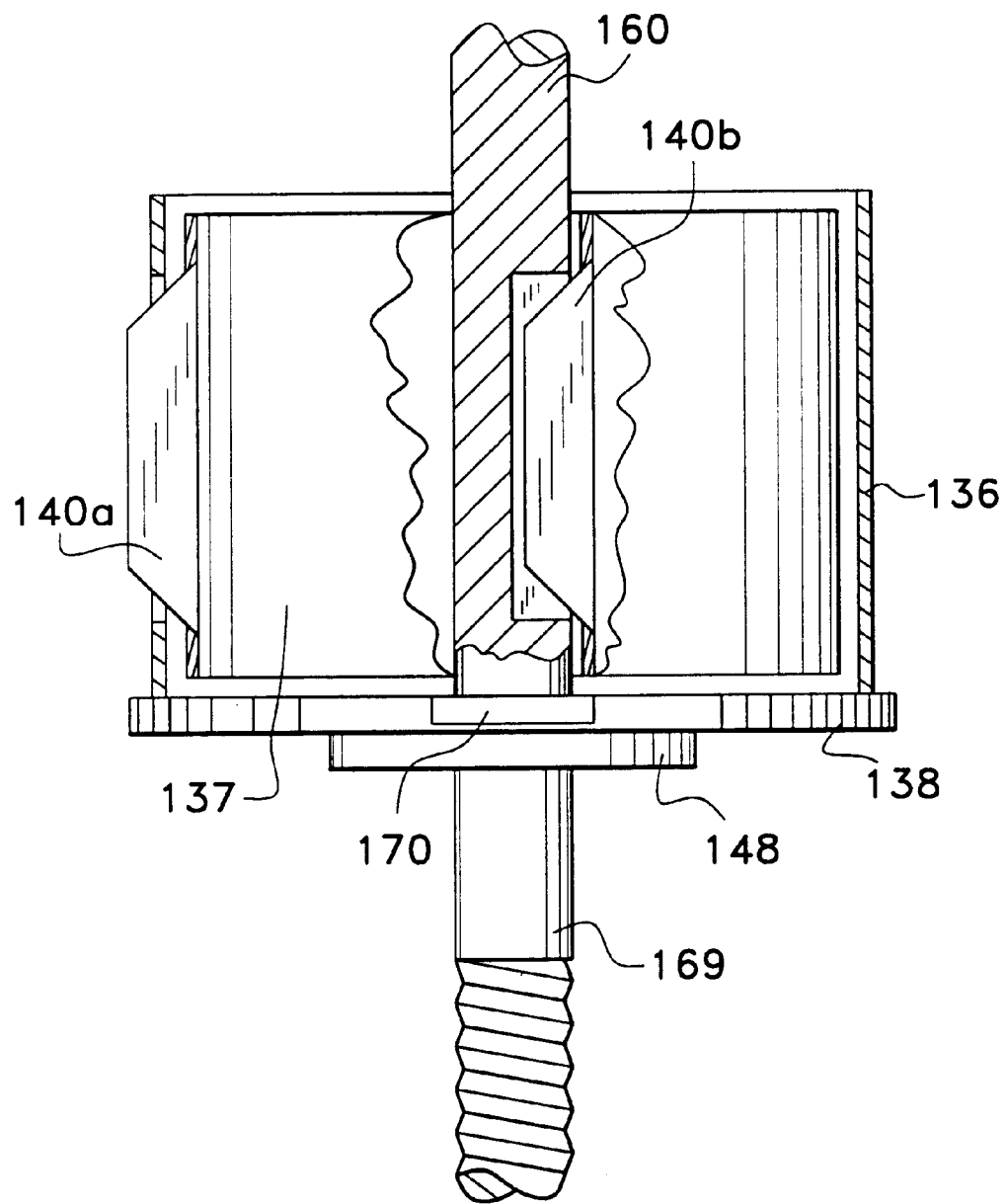
FIG. 7b is a cross-sectional view of the spiral shaped plate spring in the spring housing.

FIG. 6 is an exploded, perspective view of the components of the spring mechanism. FIG. 7*a* is a perspective view of a spiral shaped plate spring 137 showing the locations of the spring end tabs 140*a,*140*b*. One spring end tab 140*a* connects to the spring housing 136, protruding through the spring housing 136, while the other spring end tab 140*b,* disposed at the inner or center end of the spring 137, connects to the spring shaft 160. FIG. 7*b* is a cross-sectional view of the spiral shaped plate spring 137 in the spring housing 136 showing how the inner spring end tab 140*b* wraps around the spring shaft 160. The spring housing 136, the spring housing bottom plate 138, the spring winding secondary gear 148, and the spring winding secondary gear shaft 169 are secured together either by welding or by a mechanical means. The spring shaft 160, while aligned concentrically with the same axis as the spring winding secondary gear shaft 169, is not operatively coupled to the secondary gear shaft 169, but rotates independently in response to decompression of spring 137. For this purpose, spring shaft 160 is mounted in annular shaft guide 170, which may be a bushing to prevent the shaft from oscillating and may include a packed bearing to minimize friction and direct contact between spring shaft 160 and spring housing bottom plate 138. Springs of other suitable configurations can be used, for example, a strip spring.

The exact configuration of the electricity generating apparatus of the present invention is determined by the nature of doors on which the apparatus is installed. The ideal size for the apparatus would be the largest possible within the available space so that the largest amount of electricity that could be generated would be generated with the same simple motion of a door opening. The electricity generated by this method and apparatus could be collected by means of batteries for later use as emergency back up lighting. There also exist the possibility that a multiple number of electricity generating assemblies could be installed and collectively generate a given amount of electricity that is then collected or accumulated by a central facility. The central facility could then store the electricity in large capacity batteries, convert the electricity into other forms of storable energy, or if enough electrical power is collected, transforming it to suit direct power supply applications.

It is to be understood that the present invention is not limited to the embodiments described above, but encompasses any and all embodiments within the scope of the following claims.

We claim:

1. A method of generating electricity comprising the steps of:

(a) providing an electricity generating apparatus having a ratcheting mechanism attached to a connecting shaft, a generator having a driveshaft, and a spring mechanism coupling said connecting shaft to said driveshaft;

(b) attaching said ratcheting mechanism to a door rotatably mounted on a supporting structure;

(c) attaching said generator to the supporting structure;

(d) opening the door;

(e) storing the kinetic energy generated by opening the door in said spring mechanism;

(f) transferring the energy stored in said mechanism to the driveshaft of said generator in order to cause rotation of the driveshaft; and (h) storing the electricity produced by said generator in a device for storing electrical energy.

2. A method of generating electricity according to claim 1, further comprising the step of repetitively opening the door.

3. An electricity generating assembly adapted for attachment to a door rotatably mounted on a supporting structure, comprising:

a ratchet assembly having a ratchet sleeve, a ratchet-end shaft slidably disposed in said sleeve, and a ratchet head disposed at an end of said ratchet-end shaft, said sleeve being mounted on a door;

a connecting shaft attached to said ratchet head;

a spring mechanism housed within a casing, the spring mechanism including:

a plate spring;

a spring housing disposed about said spring, the housing having a spring winding secondary gear shaft depending therefrom;

a spring shaft in said spring housing, said plate spring having a first end fixedly attached to said spring housing and a second end fixedly attached to said spring shaft, said plate spring being coiled about said spring shaft; and a first gear train coupling said connecting shaft to said spring winding secondary gear;

a generator having a driveshaft and having output terminals adapted for electrical connection to a device for storing electrical energy; and a second gear train coupling said spring shaft to the drive shaft of said generator;

wherein said ratcheting mechanism causes compression and coiling of said spring when the door is opened, and wherein said spring causes said driveshaft to rotate in order to generate electricity when said spring uncoils.

4. The electricity generating assembly according to claim 3, wherein said spring housing further comprises a bottom plate having teeth, mounted on said spring winding secondary gear shaft, there further being a spring winding secondary gear, also mounted on said spring winding secondary gear shaft, said assembly further comprising a stopper engaging the teeth of the bottom plate of said spring housing in order to prevent backward rotation of said spring housing and said spring winding secondary gear when the door is closed.

5. An electricity generating assembly in combination with a door comprising:

a door rotatable mounted on a supporting structure;

a ratchet assembly having a ratchet sleeve, a ratchet-end shaft slidably disposed in said sleeve, and a ratchet head disposed at an end of said ratchet-end shaft, said sleeve being mounted on said door;

a connecting shaft attached to said ratchet head;

a spring mechanism housed within a casing, the spring mechanism including:

a plate spring;

a spring housing disposed about said spring, the housing having a spring winding secondary gear shaft depending therefrom;

a spring shaft in said spring housing, said plate spring having a first end fixedly attached to said spring housing and a second end fixedly attached to said spring shaft, said plate spring being coiled about said spring shaft; and a first gear train coupling said connecting shaft to said spring winding secondary gear;

a generator having a driveshaft and having output terminals adapted for electrical connection to a device for storing electrical energy; and a second gear train coupling said spring shaft to said drive shaft;

wherein said ratcheting mechanism causes compression and coiling of said spring when the door is opened, and wherein said spring causes said driveshaft to rotate in order to generate electricity when said spring uncoils.

6. The electricity generating assembly according to claim 5, wherein said spring is a spiral shaped plate spring.

7. The electricity generating assembly according to claim 5, further comprising a gear box housing said second gear train, said gear box being oil filled.

8. The electricity generating assembly according to claim 5, wherein said spring housing further comprises a bottom plate having teeth, mounted on said spring winding secondary gear shaft, there further being a spring winding secondary gear, also mounted on said spring winding secondary gear shaft, said assembly further comprising a stopper engaging the teeth of the bottom plate of said spring housing in order to prevent backward rotation of said spring housing and said spring winding secondary gear when the door is closed.

* * * * *